United States Patent
Yamane et al.

(10) Patent No.: US 9,367,047 B2
(45) Date of Patent: Jun. 14, 2016

(54) WIRE ELECTRIC DISCHARGE MACHINE PERFORMING TURNING TOOL MACHINING, TURNING TOOL MACHINING METHOD WITH WIRE ELECTRIC DISCHARGE MACHINE, AND PROGRAM CREATION APPARATUS FOR WIRE ELECTRIC DISCHARGE MACHINE THAT PERFORMS TURNING TOOL MACHINING

(71) Applicant: FANUC CORPORATION, Yamanashi (JP)

(72) Inventors: Hikaru Yamane, Yamanashi (JP); Yasuo Arakawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 798 days.

(21) Appl. No.: 13/684,854

(22) Filed: Nov. 26, 2012

(65) Prior Publication Data
US 2013/0211577 A1 Aug. 15, 2013

(30) Foreign Application Priority Data
Feb. 10, 2012 (JP) .................................. 2012-027209

(51) Int. Cl.
G05B 11/01 (2006.01)
B23H 7/06 (2006.01)
(Continued)

(52) U.S. Cl.
CPC ................. *G05B 11/01* (2013.01); *B23H 7/065* (2013.01); *B23H 7/20* (2013.01); *B23H 9/00* (2013.01); *G05B 19/402* (2013.01); *B23H 2500/20* (2013.01); *G05B 2219/45221* (2013.01)

(58) Field of Classification Search
CPC ................. G05B 11/01; G05B 19/402; G05B 2219/45221; G05B 2219/50; G05B 19/4093; G05B 2219/30; B23H 7/065; B23H 9/00; B23H 7/20; B23H 2500/20; B23H 7/00; B23H 1/00; B23H 2200/00
See application file for complete search history.

(56) References Cited

U.S. PATENT DOCUMENTS 5,326,954 A * 7/1994 Lenard ...................... B23H 7/02
219/69.12
5,815,400 A * 9/1998 Hirai ..................... G05F 19/401
700/173

(Continued)

FOREIGN PATENT DOCUMENTS

CN 1079926 A 12/1993
CN 101302598 A 11/2008
(Continued)

OTHER PUBLICATIONS

Office Action issued Apr. 25, 2014, corresponds to Chinese patent application No. 201310051149.8.
(Continued)

*Primary Examiner* — Ramesh Patel
(74) *Attorney, Agent, or Firm* — Hauptman Ham, LLP

(57) ABSTRACT

A measurement program for sequentially measuring measurement points, which are to be measured with a touch sensor, is created on the basis of a machining program, which is read in, for machining a turning tool. Then, the rake face height is measured on each of the measurement points and the measurement data is stored. Subsequently, a calculation method of a correction amount is selected so as to calculate the correction amount, and whether or not the calculated correction amount is smaller than a regulation value is determined. The machining program is modified on the basis of the correction amount when the correction amount is not smaller than the regulation value, while the machining program is modified on the basis of the correction amount in accordance with the selected method when the correction amount is smaller than the regulation value.

2 Claims, 9 Drawing Sheets

(51) Int. Cl.
    *B23H 7/20* (2006.01)
    *B23H 9/00* (2006.01)
    *G05B 19/402* (2006.01)

(56) References Cited

U.S. PATENT DOCUMENTS

| | | | | |
|---|---|---|---|---|
| 5,897,791 | A * | 4/1999 | Hayakawa | B23H 7/02 |
| | | | | 219/69.11 |
| 7,211,762 | B2 * | 5/2007 | Kinoshita | B23H 7/04 |
| | | | | 219/69.12 |
| 8,176,825 | B1 * | 5/2012 | Isaacson | B23C 5/1081 |
| | | | | 175/435 |
| 2006/0102596 | A1 * | 5/2006 | Kinoshita | B23H 7/04 |
| | | | | 219/69.12 |
| 2008/0184579 | A1 * | 8/2008 | McFarland | G01B 21/04 |
| | | | | 33/551 |
| 2013/0138241 | A1 * | 5/2013 | Arakawa | B23H 7/06 |
| | | | | 700/162 |

FOREIGN PATENT DOCUMENTS

| | | |
|---|---|---|
| CN | 201950308 U | 8/2011 |
| EP | 1657016 A2 | 5/2006 |
| JP | 6500739 A | 1/1994 |
| JP | 7299632 A | 11/1995 |
| JP | 9-267219 A | 10/1997 |
| JP | 9267220 A | 10/1997 |
| JP | 11267925 A | 10/1999 |
| JP | 2003117733 A | 4/2003 |
| JP | 2003311535 A | 11/2003 |
| JP | 3572039 B2 | 9/2004 |

OTHER PUBLICATIONS

Extended European Search Report issued Oct. 10, 2014, corresponding to European patent application No. 12192922.8.

Decision to Grant a Patent for Patent Application No. 2012-027209 dispatched Feb. 26, 2013.

* cited by examiner

WIRE ELECTRIC DISCHARGE MACHINE PERFORMING TURNING TOOL MACHINING, TURNING TOOL MACHINING METHOD WITH WIRE ELECTRIC DISCHARGE MACHINE, AND PROGRAM CREATION APPARATUS FOR WIRE ELECTRIC DISCHARGE MACHINE THAT PERFORMS TURNING TOOL MACHINING

RELATED APPLICATIONS

The present application claims priority from Japanese Application No. 2012-027209 filed Feb. 10, 2012, the disclosure of which hereby incorporated by reference herein in its entirety.

BACKGROUND OF THE INVENTION

1. Field of the Invention

The present invention relates to a wire electric discharge machine performing turning tool machining, a turning tool machining method with a wire electric discharge machine, and a program creation apparatus for a wire electric discharge machine that performs turning tool machining.

2. Description of the Related Art

Cases of machining a turning tool with a wire electric discharge machine have been increased in recent years (refer to Japanese Patent Application Laid-Open No. 9-267219). Especially, an object to be machined made of a hard material such as a polycrystalline diamond (PCD) tool and a polycrystalline cubic boron nitride (PCBN) tool can discharge electricity so as to be able to be machined in higher speed than machining with a grinding machine of prior art and be machined intricately with a single-shaped tool (that is, a wire electrode). Therefore, a case of machining the tools with a wire electric discharge machine has been increased.

A PCD tool and a PCBN tool are manufactured such that a PCD member and a PCBN member are cut out from a PCD material and a PCBN material in forms of tips as materials of a cutting tool, a brazing material is melted with a high frequency induction device, the tip obtained by the cutting is brazed on a shank as a cutting blade (referred to below as a "half-completed turning tool"), and the obtained piece is machined into a final shape so as to obtain a turning tool which is a completed product.

In a brazing process, a tip is positioned and fixed in a manner to interpose melted wax, so that it is hard to fix the tip on an ideal position on design without any error. Further, due to an effect of heat in brazing and unevenness of the thickness of a tip itself, waviness is frequently formed on a rake face. Consequently, a rake face of a half-completed turning tool frequently obtains a shape having an error in no small measure compared to an ideal shape on design (refer to FIGS. 5A and 5B).

In a case where the shape of a rake face is different from an ideal shape, when a machining route prepared on the basis of an ideal shape is used as it is, an error in a height direction of an actual rake face with respect to an ideal rake face adversely affects shape accuracy of an object to be machined, generating an error that is unignorable in producing of a highly-precise object. Commonly, in order to eliminate such error, a shank is fixed on a jig for which the inclination can be adjusted, a tip is inclined so that a rake face becomes closest to an ideal shape, and then machining is performed.

Thus, a jig for inclining and adjusting a tip and the process for adjusting inclination are required. Further, in a case where "waviness" is formed on a rake face, an error cannot be completely eliminated even by adjusting inclination of the rake face, generating an error on a machined blade.

Further, a tip surface is inclined, so that a reference face of a turning tool (commonly, a bottom face) is also inclined and the tip is machined into a final shape in such state. Therefore, when the tip is actually fixed on a lathe or the like and used, such complicated operation that the tip is fixed on a tool rest with the reference face thereof inclined is required, in a similar manner to turning tool machining, and similar adjustment is required every time a turning tool is exchanged.

Thus, in the conventional machining method, the number of processes is increased in both of manufacturing and a use of a turning tool, and it is hard to produce a precise blade depending on a property of a rake face.

SUMMARY OF THE INVENTION

Therefore, in the present invention, it is an object to provide a wire electric discharge machine which performs turning tool machining such that the wire electric discharge machine measures inclination and waviness of a tip surface with a measurement device before machining and changes an original machining trajectory into a trajectory adjusted to a measured actual surface of the tip so as to be able to prepare a highly-precise and easy-to-use blade, a turning tool machining method with the wire electric discharge machine, and a program creation apparatus for a wire electric discharge machine that performs the turning tool machining.

A wire electric discharge machine for turning tool machining according to the present invention performs machining of an edge part of a turning tool to which a tip is attached by moving a wire electrode relative to a table on which the turning tool is placed, in accordance with a machining program. This wire electric discharge machine includes a measurement unit configured to measure a height from a reference face on a plurality of points on a route of the machining program, an error calculation unit configured to calculate a height error of a surface of the tip with respect to a reference rake face having no tip-attaching error, on the basis of the height that is measured by the measurement unit, a correction amount calculation unit that calculates a correction amount on each measurement point on the basis of the error on each measurement point that is calculated and a taper angle of the wire electrode in performance of machining that is instructed by the machining program, so that a position, on a horizontal plane, of the edge part of the turning tool accords with a position, on the horizontal plane, of an edge part of the reference rake face, and a control unit configured to control movement of the wire electrode relative to the turning tool on the basis of the correction amount that is calculated by the correction amount calculation unit.

When an object to be machined of the turning tool is a rotating body, the correction amount calculation unit may calculate a correction amount on each measurement point on the basis of the error, the taper angle of the wire electrode in performance of machining instructed by the machining program, and a distance from a rotation center axis of the object to be machined to the edge part of the turning tool, so that a distance from the rotation center axis of the object to be machined to the edge part of the turning tool accords with a distance from the rotation center axis of the object to be machined to the edge part on the reference rake face.

In a turning tool machining method by a wire electric discharge machine according to the present invention, an edge part of a turning tool to which a tip is attached is machined by moving a wire electrode relative to a table on which the turning tool is placed, in accordance with a machining program. The turning tool machining method by a wire electric discharge machine includes the steps of measuring a height from a reference face on a plurality of points on a route of the machining program, calculating a height error of a surface of the tip with respect to a reference rake face having no tip-attaching error, on the basis of the height that is measured, calculating a correction amount on each measurement point on the basis of the error on each measurement point that is calculated and a taper angle of the wire electrode in performance of machining that is instructed by the machining program, so that a position, on a horizontal plane, of the edge part of the turning tool accords with a position, on the horizontal plane, of an edge part of the reference rake face, and controlling relative positions of the wire electrode and the turning tool on the basis of the correction amount that is calculated.

When an object to be machined of the turning tool is a rotating body, a correction amount on each measurement point may be measured on the basis of the error, the taper angle of the wire electrode in performance of machining instructed by the machining program, and a distance from a rotation center axis of the object to be machined to the edge part of the turning tool, so that a distance from the rotation center axis of the object to be machined to the edge part of the turning tool accords with a distance from the rotation center axis of the object to be machined to the edge part on the reference rake face, in the step of calculating a correction amount.

A program creation apparatus for a wire electric discharge machine that performs turning tool machining, according to the present invention, creates a program for machining an edge part of the turning tool and includes a machining route creation unit configured to create a machining route with respect to a reference rake face having no error, an input unit configured to input a result that is obtained by measuring a height from a reference face on a plurality of points on the machining route, an error calculation unit configured to calculate a height error of a tip surface with respect to the reference rake face having no tip-attaching error, on the basis of the inputted value, a correction amount calculation unit configured to calculate a correction amount on each measurement point on the basis of the error on each measurement point that is calculated and an angle formed by a rake face and a flank face of the turning tool that is determined in design, so that a position, on a horizontal plane, of the edge part of the turning tool accords with a position, on the horizontal plane, of an edge part on the reference rake face, a machining route calculation unit configured to calculate a new machining route that is obtained by correcting the machining route on the basis of the correction amount that is calculated, and a machining program creation unit configured to create a machining program with respect to the new machining route that is calculated.

A program creation apparatus for a wire electric discharge machine that performs turning tool machining, according to the present invention, creates a program for machining an edge part of the turning tool and includes a storage unit configured to store the machining program for machining a turning tool, an input unit configured to input a result that is obtained by measuring a height from a reference face on a plurality of points on a route of the machining program, an error calculation unit configured to calculate a height error of a tip surface with respect to a reference rake face having no tip-attaching error, on the basis of the inputted value, a correction amount calculation unit configured to calculate a correction amount on each measurement point on the basis of the error on each measurement point that is calculated and an angle formed by a rake face and a flank face of the turning tool that is determined in design, so that a position, on a horizontal plane, of the edge part of the turning tool accords with a position, on the horizontal plane, of an edge part on the reference rake face, and a machining program creation unit configured to create a new machining program that is obtained by correcting the machining program on the basis of the correction amount that is calculated.

When an object to be machined of the turning tool is a rotating body, the correction amount calculation unit may calculate a correction amount on each measurement point on the basis of the error, an angle formed by a rake face and a flank face of the turning tool that is determined in design, and a distance from a rotation center axis of the object to be machined to the edge part of the turning tool, so that a distance from the rotation center axis of the object to be machined to the edge part of the turning tool accords with a distance from the rotation center axis of the object to be machined to the edge part on the reference rake face.

According to the present invention, a wire electric discharge machine that performs turning tool machining such that the wire electric discharge machine measures inclination and waviness of a tip surface with a measurement device before machining and changes an original machining trajectory into a trajectory adjusted to a measured actual surface of a tip so as to be able to prepare a highly-precise and easy-to-use blade, a turning tool machining method by the wire electric discharge machine, and a program creation apparatus for a wire electric discharge machine that performs turning tool machining can be provided.

BRIEF DESCRIPTION OF THE DRAWINGS

The above-mentioned and other object and features of the present invention will be clear from the following description of an embodiment with reference to the accompanying drawings. Among the drawings.

DETAILED DESCRIPTION OF THE PREFERRED EMBODIMENTS

Figure 1:
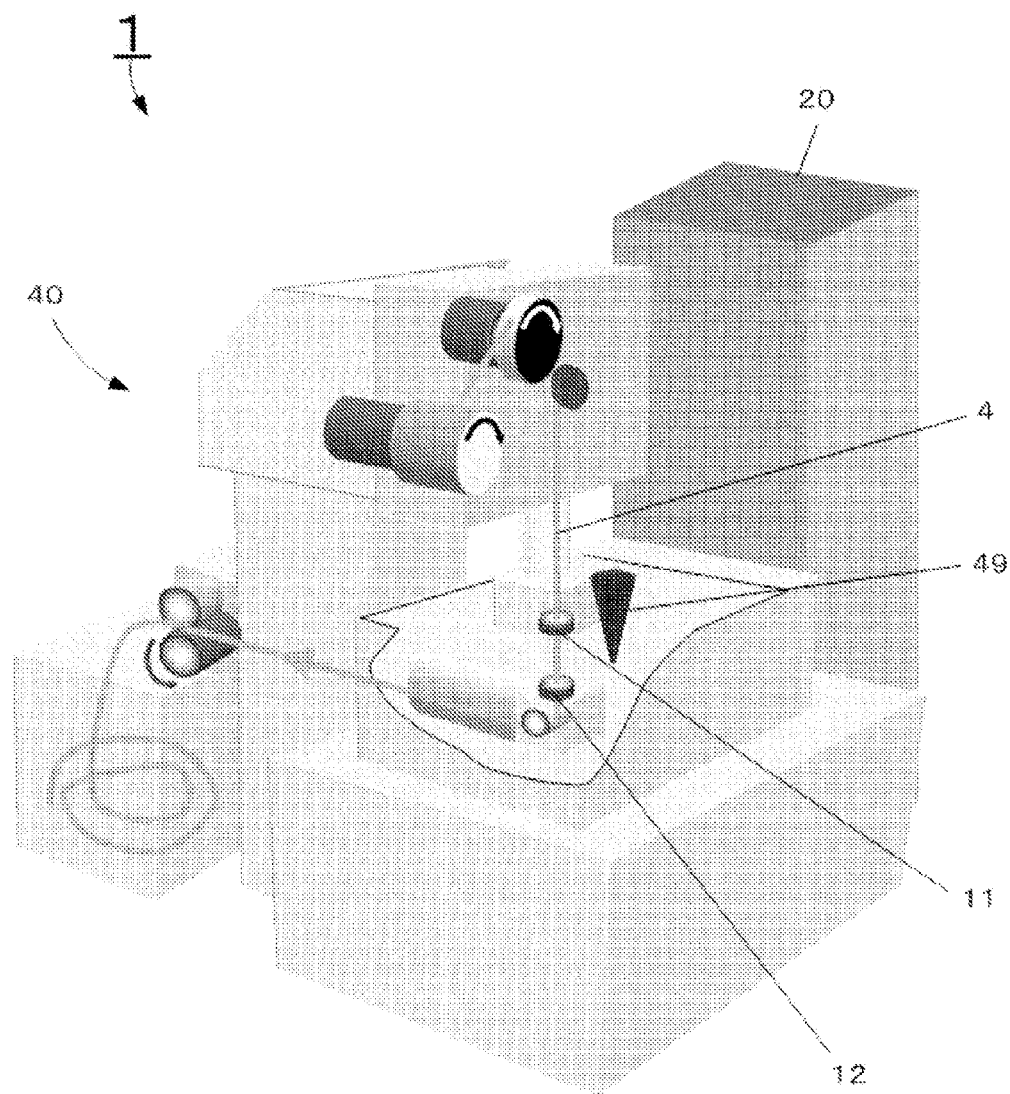
FIG. 1 schematically illustrates a wire electric discharge machine according to the present invention.

FIG. 1 is a schematic view illustrating a wire electric discharge machine according to the present invention. A wire electric discharge machine includes a wire electric discharge machine body 40 and a numerical controller 20 which controls the wire electric discharge machine body 40. A wire electrode 4 is stretched between upper and lower wire guides 11 and 12.

A touch sensor 49 is attached on an upper wire guide part. The touch sensor 49 is attached in parallel with a traveling direction of a wire electrode 4 to be able to be moved vertically by an advancing and retracting mechanism (not depicted), and outputs a signal for detecting contact when the touch sensor 49 is brought into contact with a measuring object. The touch sensor 49 is pulled up to a retracting position at time other than measurement. This touch sensor 49 is used as a measurement unit to measure the height from a reference face on a plurality of points on a route of a machining program, so as to acquire data for calculating a height error of a tip surface with respect to a reference rake face having no tip-attaching error.

Figure 2:
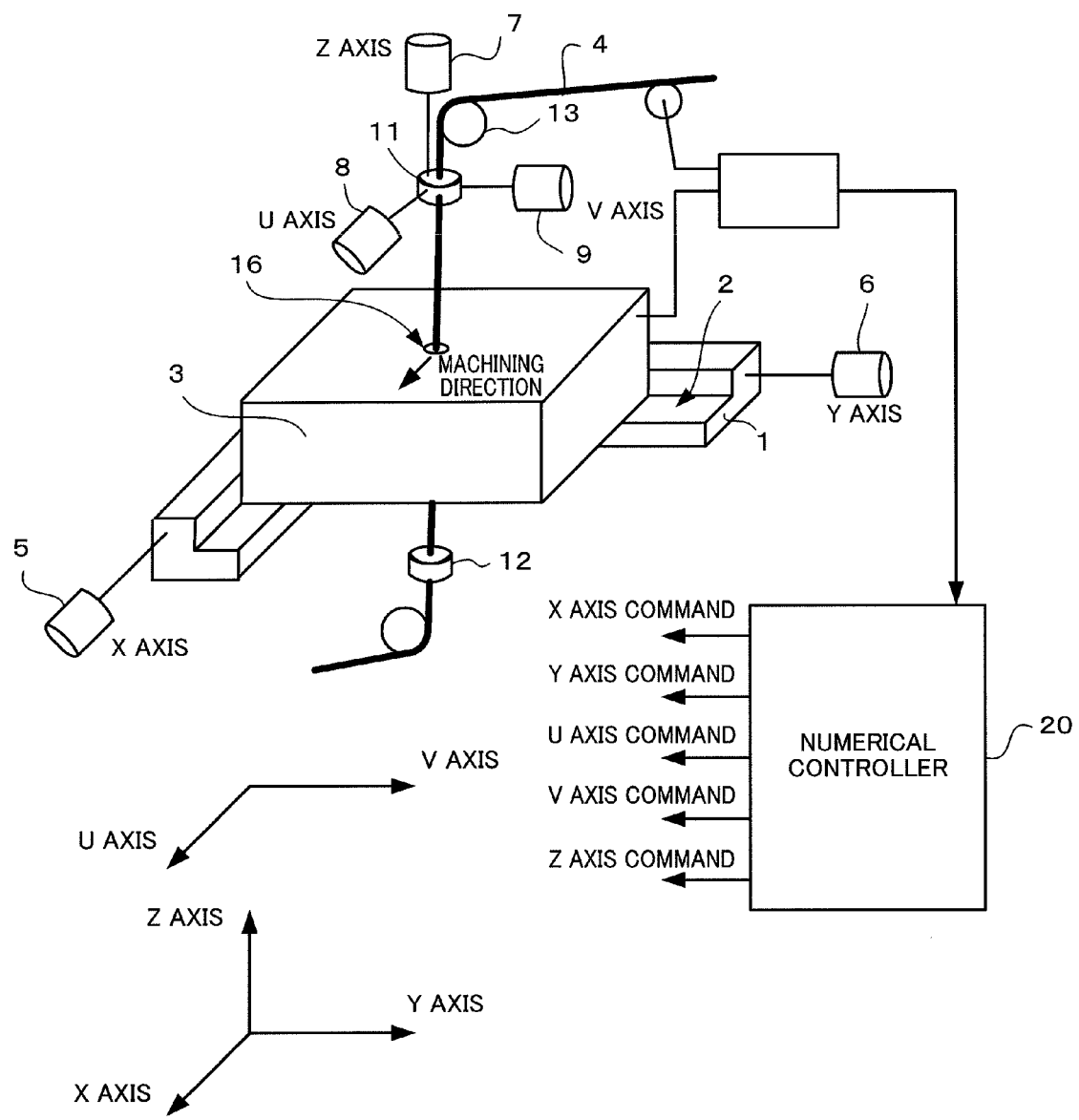
FIG. 2 illustrates the schematic configuration and an operation of the wire electric discharge machine to which the present invention is applicable.

FIG. 2 illustrates the schematic configuration and an operation of a wire-cut electric discharge machine to which the present invention is applicable.

The schematic configuration of a wire-cut electric discharge machine depicted in FIG. 2 is same as that of prior art. A reference numeral 1 denotes a workpiece mounting table on which a workpiece 3 which is an object to be machined is placed and fixed. The workpiece mounting table 1 includes a placing face 2 having highly-precise flatness. In machining, the workpiece 3 is placed and fixed on the workpiece mounting table 1 so that a bottom face of the workpiece 3 is brought into contact with the placing face 2. In machining, the wire electrode 4 is stretched between upper and lower wire guides 11 and 12 by a connecting operation and a voltage for generating discharge between the wire electrode 4 and the workpiece 3 is applied to the wire electrode 4.

Commonly, the placing face 2 of the workpiece mounting table 1 extends in a horizontal direction (is placed on a plane parallel to an XY plane). The workpiece mounting table 1 can be driven on a plane parallel to the XY plane, which has the X axis and the Y axis as orthogonal axes, by X-axis and Y-axis servo motors 5 and 6. Further, the upper wire guide 11 can be driven on a plane parallel to the XY plane by U-axis and V-axis servo motors 8 and 9. Furthermore, the upper wire guide 11 can be driven also in a direction orthogonal to the XY plane by a Z-axis servo motor 7. Commonly, a moving direction by the U axis and a moving direction by the X axis are parallel to each other and a moving direction by the V axis and a moving direction by the Y axis are parallel to each other. Alternatively, the workpiece 3 may be fixed and the wire electrode 4 may be moved by the X-axis servo motor 5 and the Y-axis servo motor 6.

In order to change a machined part 16, relative positions of the workpiece 3 and the wire electrode 4 are changed. This change is performed in accordance with commands (X-axis command, Y-axis command, U-axis command, V-axis command, and Z-axis command) which are outputted from the numerical controller 20 to the servo motors of respective axes. The content of the command is specified by a machining program. The machining program is a program for specifying a moving command of the wire electrode 4, that is, a moving command to the servo motor of each axis and is defined on a plane parallel to the above-mentioned XY plane. This defined plane can be set at an arbitrary position in the Z-axis direction. This plane which can be arbitrarily set is referred to as a program plane.

Figure 3A:
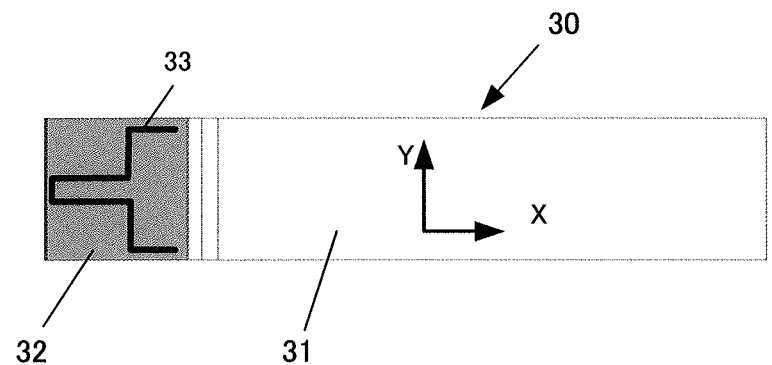
FIGS. 3A and 3B illustrate a machining route of an object to be machined (before machining)
Figure 3B:
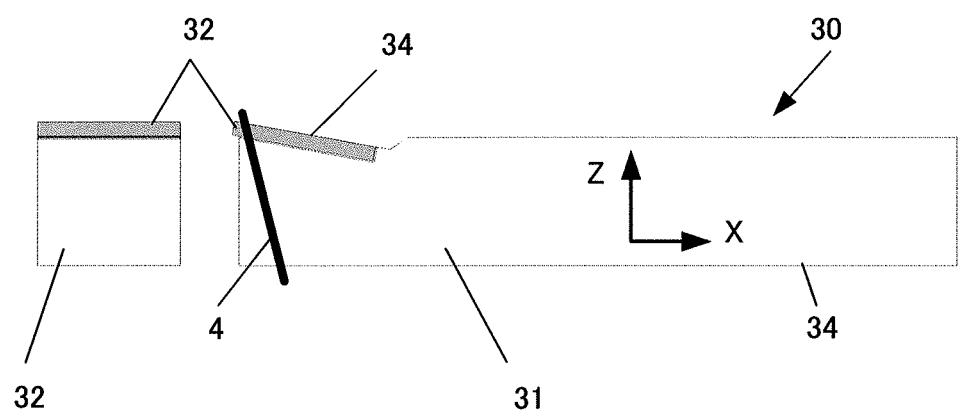

A case of machining a turning tool having a shape depicted in FIGS. 3A and 3B is now described. Here, coordinate axes in FIGS. 3A and 3B are provided for descriptive purposes and correspond to coordinate axes of FIG. 2.

A turning tool 30 is placed on the workpiece mounting table 1 (refer to FIG. 2) as the workpiece 3, and a turning tool bottom face is set as a reference face. The turning tool 30 is composed of a shank 31 and a tip 32 which is brazed on the shank 31. FIGS. 3A and 3B illustrate the turning tool 30 having an ideal shape in which the tip 32 is brazed on the shank 31 in an ideal posture. FIG. 3A is a plan view and FIG. 3B is an elevation view and a lateral view.

As depicted in FIG. 3A, electric discharge machining is performed along a machining route 33. As depicted in FIG. 3B, a rake face 34 is an upper face of the tip 32. When electric discharge machining is performed, the wire electrode 4 is inclined with respect to the Z axis direction as depicted in FIG. 3B and the electric discharge machining is performed along the machining route 33 depicted in FIG. 3A.

Figure 4A:
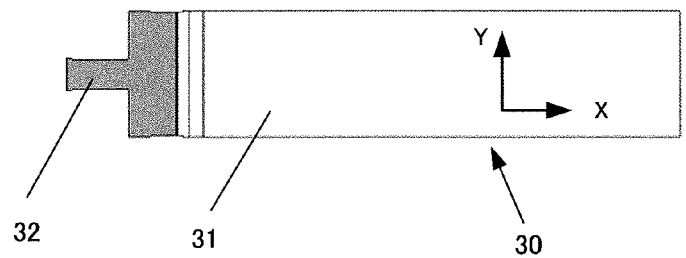
FIGS. 4A and 4B illustrate a machining route of an object to be machined (after machining)
Figure 4B:
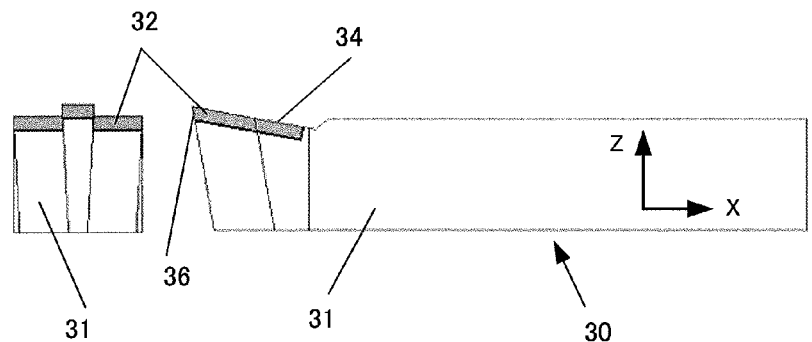
Figure 5A:
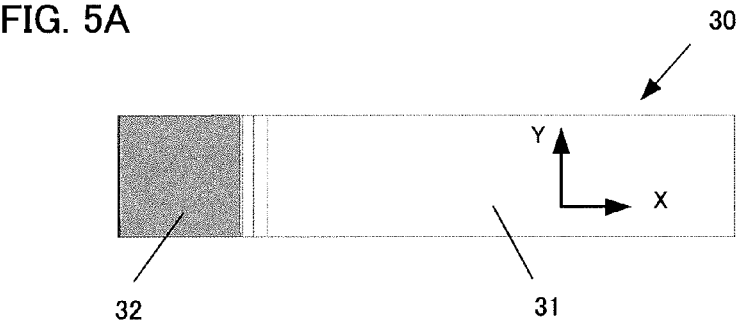
FIGS. 5A and 5B illustrate an actual shape before machining of a turning tool which is an object to be machined.
Figure 5B:
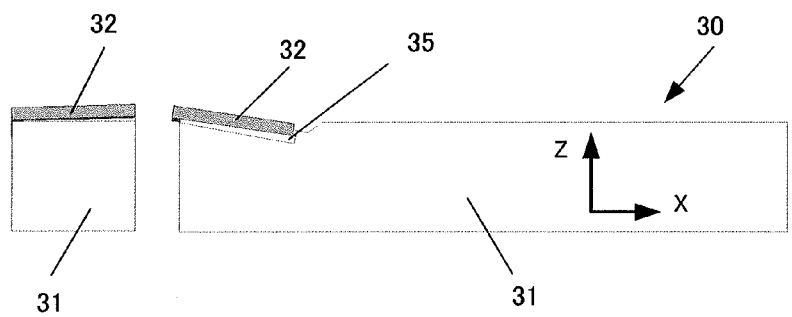

In a case where the tip 32 is brazed on the shank 31 in an ideal state as depicted in FIGS. 3A and 3B, the tuning tool 30 having an ideal shape can be obtained as depicted in FIGS. 4A and 4B by performing the electric discharge machining in accordance with a machining program. This rake face 34 of the turning tool 30 having the ideal shape is set as a reference rake face having no tip-attaching error. However, the shape of the turning tool 30 before machining is such that the tip 32 is fixed on the shank 31 in an inclined fashion with respect to an ideal posture due to thickness unevenness of a brazing material 35 as depicted in FIGS. 5A and 5B. In this case, the rake face 34 deviates from the above-mentioned reference rake face having no tip-attaching error. In the present invention, the tip 32 which is fixed in the inclined fashion is measured with a measuring unit such as the touch sensor 49 (refer to FIG. 1) along a machining route so as to obtain an amount of deviation from an ideal posture.

Calculation of this deviation amount is described with reference to FIGS. 6 to 9.

Figure 6:
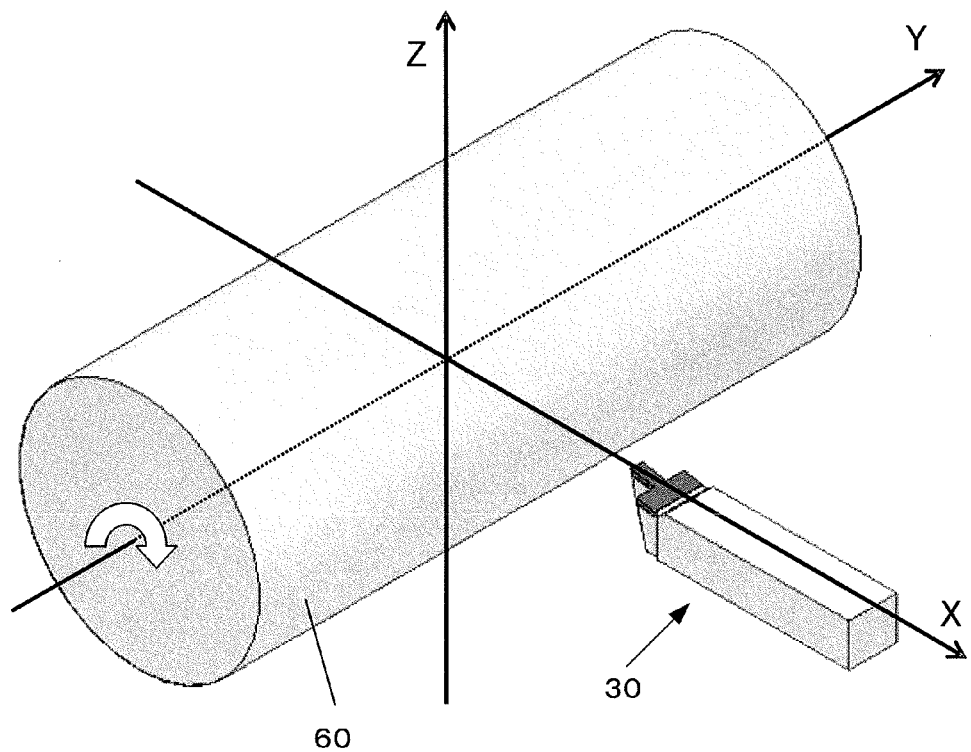
FIG. 6 illustrates a relative positional relationship (in a case where the turning tool faces an X axis direction) between a coordinate system of an object to be machined and the turning tool.

Here, as depicted in FIG. 6, a rotation center axis of an object to be machined 60 of the turning tool 30 is set as the Y axis, a direction orthogonal to the Y axis is set as the X axis, and a thickness direction of the turning tool is set as the Z axis. A bottom face of the turning tool is set as a reference face. A longitudinal direction of the tuning tool is the X axis.

(1) The height of an actual rake face from the reference face is measured with the touch sensor 49 on a plurality of points on a machining route which is instructed by a measurement program. A plurality of measurement points are defined at certain intervals (for example, 1 mm) from a start point of the measurement program. The measurement points are defined by equally dividing (for example, dividing by 10) parts between inflection points and bending points on the machining route. It is favorable to define the measurement points such that measurement intervals are different among respective machining routes according to shapes of the machining routes so as to be set roughly on a straight line and precisely on a curve.

(2) An amount of an error which is deviation of an actual rake face from the reference rake face in the Z axis direction is calculated on each of the measurement points on the basis of a value (a value of distance from the reference face to the rake face) measured with the touch sensor 49. A correction amount is calculated on the basis of the error amount which is obtained by the calculation, in accordance with a relationship depicted in FIGS. 8 and 9.

Figure 8:
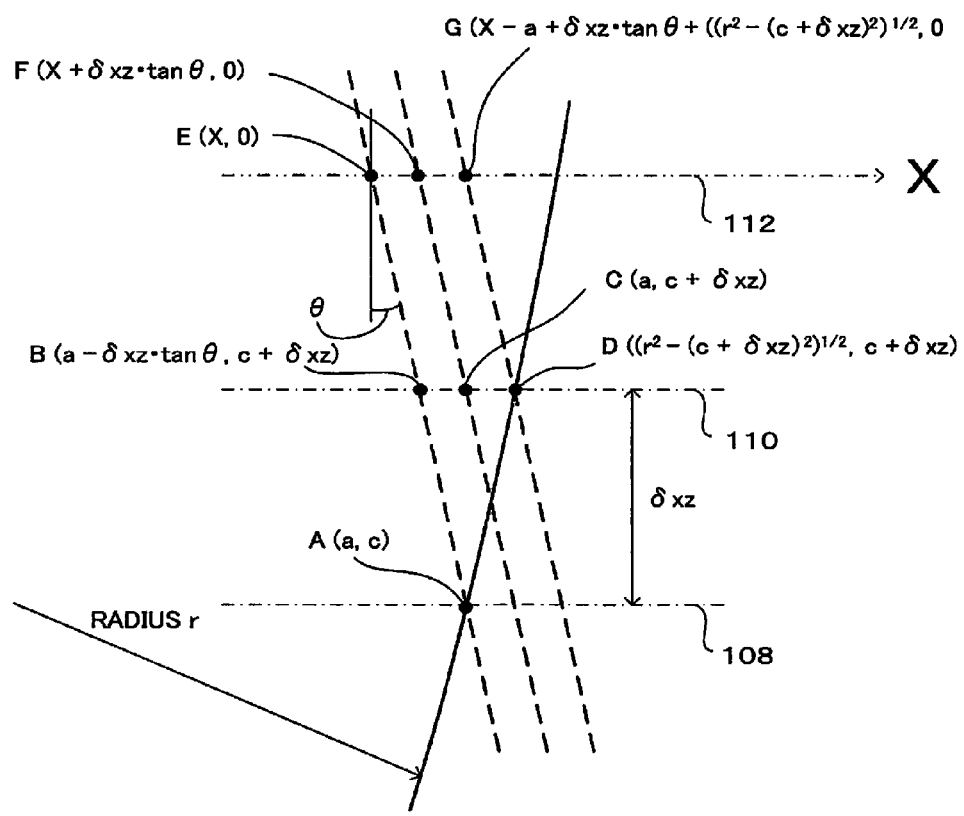
FIG. 8 illustrates a correction calculation in an XZ plane.
Figure 9:
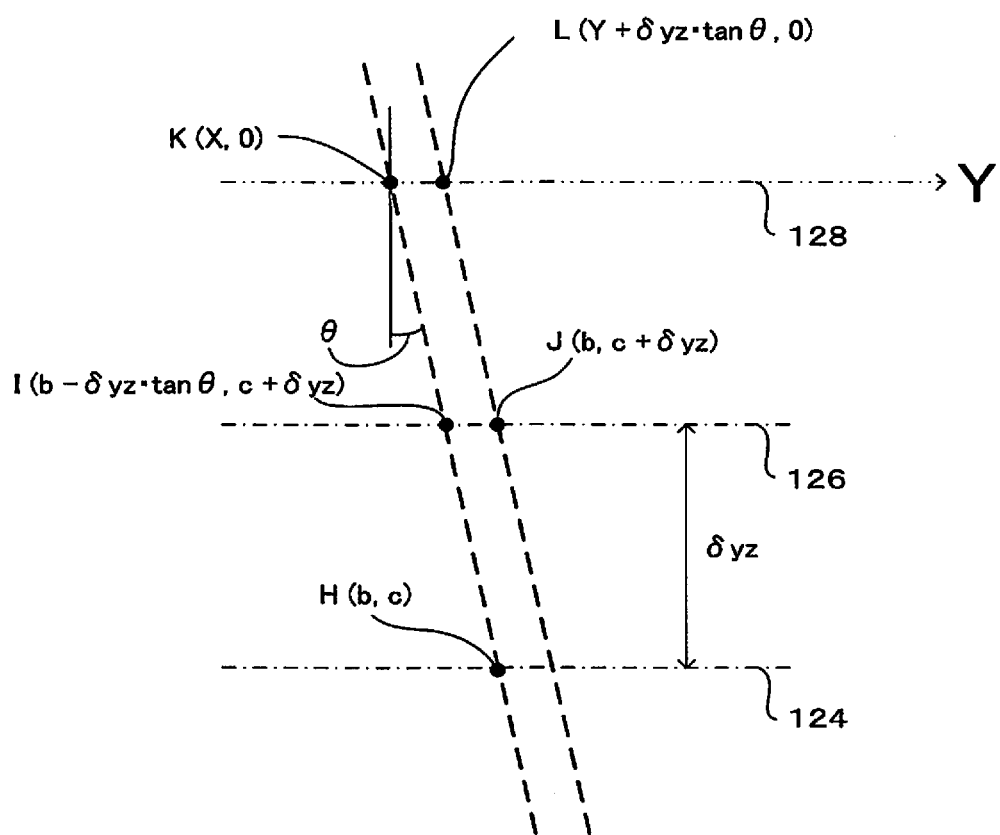
FIG. 9 illustrates a correction calculation in a YZ plane.
Figure 9:
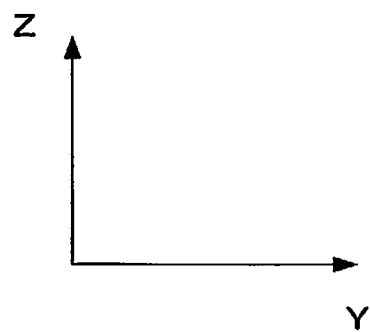

FIG. 8 illustrates correction calculation on the XY plane. A reference character A denotes a machining point in an ideal shape, a reference character B denotes an actual machining point, a reference character C denotes an actual point, a reference character D denotes a point on a radius r, a reference character E denotes a point before correction on a program plane, a reference character F denotes a correction point 1, and a reference character G denotes a correction point 2. On the other hand, FIG. 9 illustrates correction calculation on the YZ plane. A reference character H denotes a machining point in an ideal shape, a reference character I denotes an actual machining point, a reference character J denotes an actual point, a reference character K denotes a point before correction on a program plane, and a reference character L denotes point after correction on the program plane.

(3) As depicted in FIG. 8 (XY plane) and FIG. 9 (YZ plane), a program planes 112 and 128 are set on the XY plane, and a coordinate on a measurement point in the ideal shape is set as (a,b,c). Further, deviation (error) of an actual shape from the ideal shape in the Z direction is denoted as $\delta xz$ and $\delta yz$, a taper angle of the wire electrode on the measurement point (a,b,c) is denoted as $\theta$, and a radius of the object to be machined 60 on the measurement point is denoted as r. A point on the program plane corresponding to the measurement point (a,b,c) is set as (X,Y,0).

(3-1) A coordinate on the XY plane on the program plane after correction can be expressed (a) by obtaining a correction amount on the basis of three values which are an error $\delta xz$ in the Z direction on an arbitrary coordinate point in the XZ plane (difference in height between a tip surface (reference face) 108 having no tip-attaching error and an actual tip surface 110 of a turning tool before machining), a wire angle $\theta$, and a distance r from the Y axis (rotation center axis of the object to be machined 60), or (b) by obtaining a correction amount on the basis of an error $\delta yz$ in the Z direction on an arbitrary coordinate point in the YZ plane (difference in height between a tip surface (reference face) 124 having no tip-attaching error and an actual tip surface 126 of a turning tool before machining), and a wire angle $\theta$, as the following:

correction point 1: $(X+\delta xz \cdot \tan\theta, Y+\delta xz \cdot \tan\theta, Z)$ and
correction point 2: $(X-\delta xz+\delta xz \cdot \tan\theta+((r^2-(c+xz)^2)^{1/2}, Y+xz \cdot \tan\theta, Z)$.

Here, the correction point 1 corresponds to F in FIG. 8, and is used in a case where a radius r is unclear, such as a case of a general-purpose turning tool. On the other hand, the correction point 2 corresponds to G of FIG. 8, and is used in a formed turning tool which is used when a radius r of the object to be machined 60 is clear. When a shape of the object to be machined 60 is clear, an error of the correction point 2 is smaller than that of the correction point 1.

(3-2) In a similar manner, a coordinate on the YZ plane on the program plane after correction can be expressed as following:

correction point 3: $(Y+\delta yz \cdot \tan\theta, 0)$.

Here, the correction point 3 corresponds to L of FIG. 9.

(4) Here, coordinates of the correction points in the above (3) are calculated by using realistic values. When an error from the ideal shape is small, difference between the correction points 1 and 2 does not have a relatively large value. For example, when (a, b, c)=(49.96, 0, −2), $\delta xz$=0.05, $\theta$=10°, and r=50 mm are set, [correction point 2−correction point 1]=approximately 2 μm is obtained in the X coordinate. Thus, difference between the correction point 1 and the correction point 2 is ignorable in cases of tools other than highly-precise tools. However, compared to a point before correction, [correction point 2−correction point 1]=approximately 11 μm is obtained, and it is understood that the error would be large without correction.

Figure 10A:
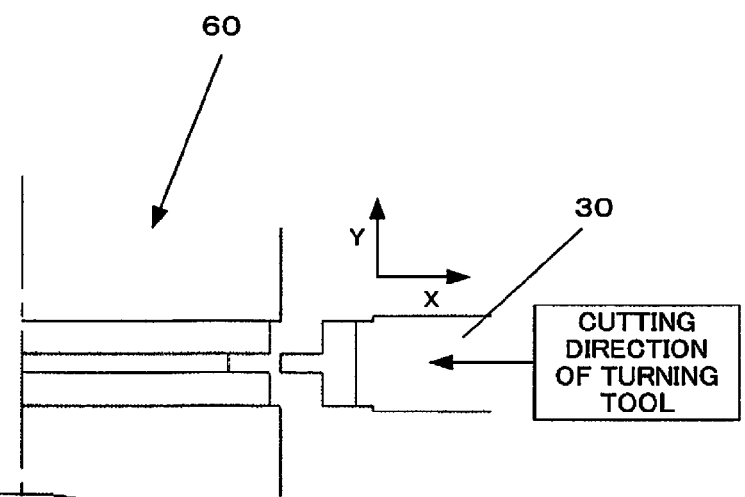
FIGS. 10A and 10B are a schematic side view and a schematic top view, respectively, of an object to be machined and a turning tool in an example of a specific shape of the turning tool.
Figure 10B:
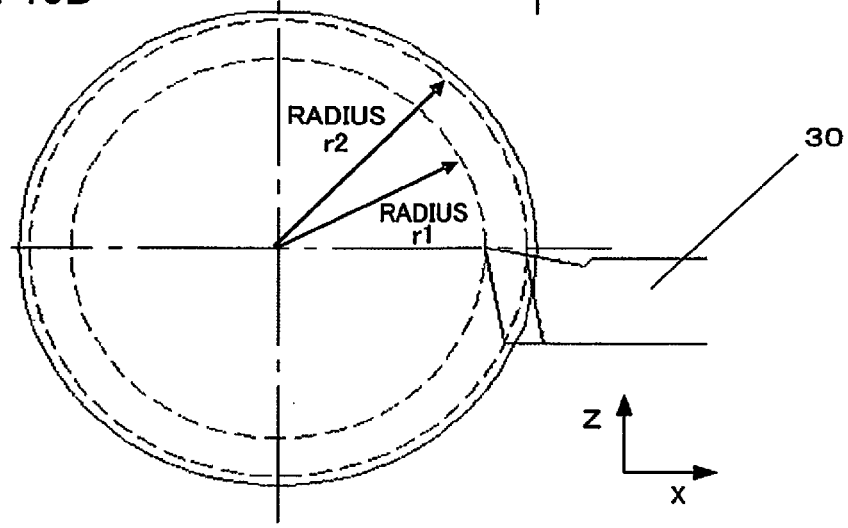

(5) As a realistic example, in a case of the turning tool of FIGS. 3A and 3B, a case of simultaneously machining a plurality of grooves on a cylinder as depicted in FIGS. 10A and 10B can be considered. For example, it is assumed that e=10°, a radius r1 in machining with a blade edge on a front edge=40 mm, and a radius r2 in machining with a following blade edge=48 mm are set, heights of the blade edges are same as each other, and an angle of an actual rake face is 9° (which deviates by 1° from an ideal angle). In this case, a value of $\delta xz$ in a calculation equation is approximately 0.2 in a case of the blade edge for machining an object having radius r2, and final radius error of an object to be machined becomes large as follows:

no correction=47.959 . . . (error is approximately 41 μm),
correction point 1=47.994 . . . (error is approximately 6 μm), and
correction point 2=48.000 . . . (no error).

In the case of the turning tool of FIGS. 3A and 3B, pitch accuracy of the radius r1 and the radius r2 is often required. Adjustment of cut in the X axis direction does not change the pitch accuracy, for this reason, correction of the blade edge is important.

(6) A correction amount on each measurement point is obtained in accordance with the relationship of the coordinates described in the above (3) so as to control relative positions of the wire electrode 4 and the turning tool 30 in accordance with the correction amount in actual machining. As the controlling method of the relative positions, a correction amount is inputted into the numerical controller of the machine. When the machine moves to a certain measurement point, the numerical controller issues a moving command, which is obtained by adding a correction amount to a moving distance to the measurement point, to the machine. Points obtained by adding the correction amount to the measurement points are connected by a straight line or a curved line so as to obtain a new machining route. Alternatively, the machining program may be recreated in the program creation apparatus taking the correction amount into account.

Figure 7:
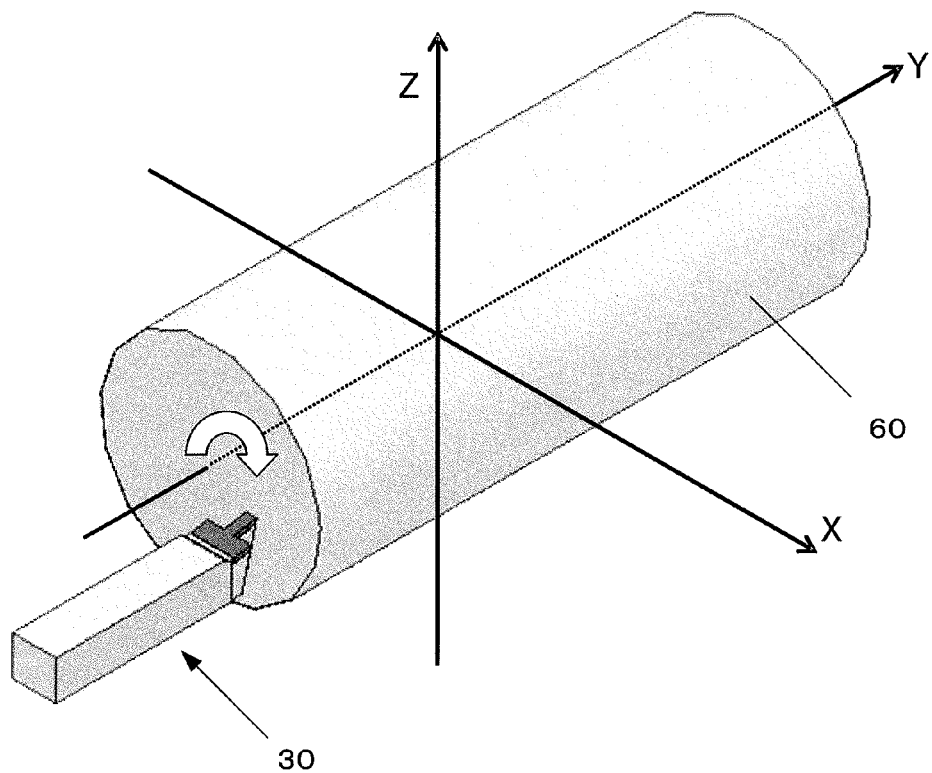
FIG. 7 illustrates a relative positional relationship (in a case where the turning tool faces a Y axis direction) between a coordinate system of an object to be machined and the turning tool.

(7) In the relationship of the coordinates described in the above (3), a correction amount can be obtained from three values which are an error $\delta xz$ in the Z direction on an arbitrary point on the XZ plane, a wire angle $\theta$, and a distance r from the Y axis unless a coordinate system of an object to be machined is changed. Therefore, even if a positional relationship between the turning tool and an object to be machined is changed as depicted in FIG. 7, for example, the relationship of the coordinates described in the above (3) can be used as it is.

(8) In a case of a turning tool used in a planer or the like in which the object to be machined 60 is not rotated, the object to be machined 60 is not rotated, so that a correction amount can be calculated by using the equation of the correction point 1.

(9) Since a correction amount has commonly has a small value, it can be considered that a point after correction is near a measurement point and a range of the point after correction is parallel to (same height as) an approximate reference face. Therefore, it is not considered that another measurement is necessary. However, there is such possibility that a height error is generated when a correction amount is large, so that it is necessary to measure a point after correction along a new machining route.

(10) In the above-described example, the bottom face of the turning tool is set as the reference face. However, in an actual operation, another face opposed to the bottom face of the turning tool, a jig face on which the shank is fixed, or the like can be employed as the reference face in substitution for the bottom face. Further, even in a case where the shank is a round bar or the like and therefore a plain face cannot be obtained, a virtual reference face obtained by calculation based on measurement of a proper position (commonly, upper and lower ends) of the bar can be employed.

(11) In also a case of machining a throw-away tip which is put on a front edge of the turning tool, highly-precise machining is enabled by measuring a rake face and performing correction as is the case with the above-described example.

As described above, a highly-precise and easy-to-use turning tool can be prepared by obtaining a height error of an actual rake face with respect to the reference rake face and controlling relative positions of the wire electrode and the turning tool in the light of a taper angle of the wire electrode in machining, an ideal machining trajectory, and a distance from the rotation center axis of an object to be machined to the blade edge of the turning tool in actual machining.

(12) An example of creating a machining program of the turning tool is now described.

A blade fixing jig is set on a table of the electric discharge machine and a three-dimensional measurement device table and a half-completed turning tool is fixed on a jig of the three-dimensional measurement device. It is assumed that the blade fixing jig and the jig of the three-dimensional measurement device are manufactured so as to be able to fix the turning tool in a similar fashion.

(13) In a similar manner to above-described (1) to (3), on the three-dimensional measurement device, the height of an actual rake face with respect to a prepared reference rake face is measured on a plurality of points on a machining route and measurement is performed for a turning tool reference face as well. Then, the measurement result is inputted into the program creation apparatus in which a machining program is stored. A height error of a tip surface with respect to the reference rake face having no tip-attaching error is calculated on the basis of the inputted measurement result and dimension on turning tool design. On the basis of the calculated error and an angle formed by the rake face which is set on design and a flank face of the turning tool, a correction amount on each measurement point is calculated so that a position, on a horizontal plane, of an edge part of the turning tool accords with a position, on a horizontal plane, of an edge part on the reference rake face. Then, a machining program suitable for the half-completed turning tool may be created with the program creation apparatus by using the calculated correction amount.

In a case where the object to be machined 60 of the turning tool 30 is a rotating body as depicted in FIGS. 6 and 7, a correction amount of each measurement point is calculated on the basis of a height error of the tip surface with respect to the reference rake face having no tip-attaching error, an angle which is formed by the rake face and the flank face of the turning tool and is set on design, and a distance from the rotation center axis of the object to be machined 60 to the edge part of the turning tool 30, so that the distance from the rotation center axis of the object to be machined 60 to the edge part of the turning tool 30 accords with the distance from the rotation center axis of the object to be machined 60 to the edge part on the reference rake face, as is the case with the correction point 1 and correction point 2 described above. Then, a machining program suitable for the half-completed turning tool may be created with the program creation apparatus by using the calculated correction amount.

(14) The turning tool is fixed on the jig put on the electric discharge machine table and machining is performed in accordance with the created program. Since the program is created in the light of the error in this case, it is not necessary to further perform measurement and correction with the electric discharge machine.

As described above, measurement and a program creation are performed in the outside of the machine, enabling high precision machining by the turning tool and enabling to shorten setting time.

Figure 11:
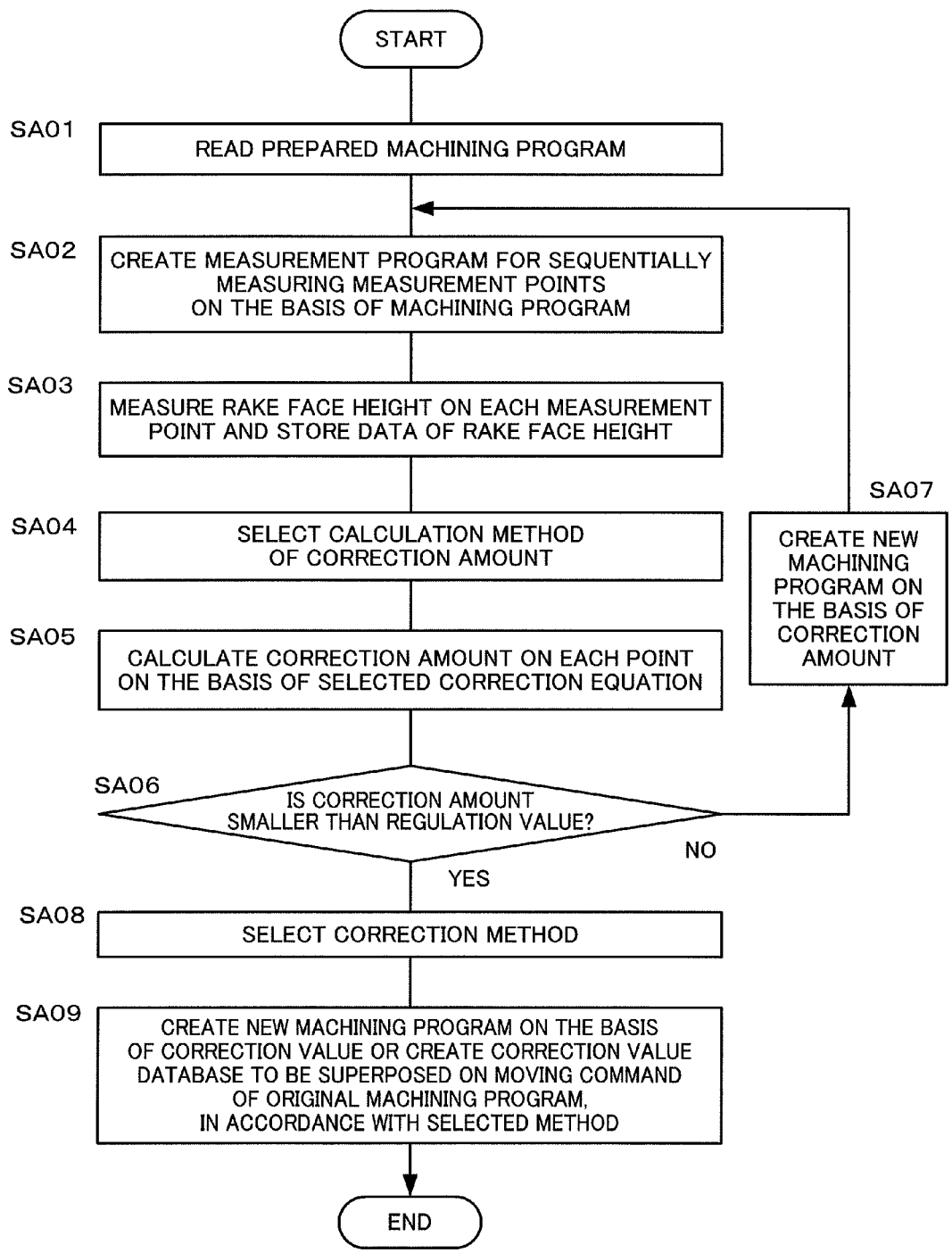
FIG. 11 is a flowchart for illustrating a machining program creation processing, which is performed by a numerical controller 20 of FIG. 1, according to the present invention.

FIG. 11 is a flowchart illustrating machining program creation processing performed by the numerical controller 20 of the wire electric discharge machine. The processing is described according to respective steps.

[Step SA01] A machining program for machining a turning tool, which is preliminarily created, is read.

[Step SA02] A measurement program for sequentially measuring measurement points which are to be measured with the touch sensor 49 is created on the basis of the machining program.

[Step SA03] The rake face height is measured in each of the measurement points so as to store data of the rake face height.

[Step SA04] A calculation method of a correction amount is selected. Here, such selection of the calculation method means choosing a correction point to be obtained, the correction point 1 or the correction point 2.

[Step SA05] A correction amount is calculated by the calculation method of a correction amount which is selected in step SA04. In a calculation procedure of a correction amount, a height error with respect to the reference rake face having no tip-attaching error is calculated and a correction amount on each measurement point is calculated on the basis of the calculated error on each measurement point and a taper angle of the wire electrode in performance of machining which is instructed by the machining program, so that a position, on the horizontal plane, of the edge part of the turning tool accords with a position, on the horizontal plane, of the edge part on the reference rake face.

[Step SA06] Whether or not the correction amount is smaller than a regulation value is determined. When the correction amount is smaller than the regulation value, the processing proceeds to step SA08. When the correction amount is not smaller than the regulation value, the processing proceeds to step SA07.

[Step SA07] The machining program is modified on the basis of the correction amount and the processing returns to step SA02.

[Step SA08] A correction method is selected.

[Step SA09] In accordance with the selected method, the machining program is modified on the basis of the correction amount or correction value database to be superposed on a moving command of the original machining program is created. Then, this processing is ended.

The invention claimed is:

1. A wire electric discharge machine for performing turning tool machining of an edge part of a turning tool to which a tip is attached, the wire electric discharge machine comprising:
 a table;
 a wire electrode;
 a controller configured to control movement of the wire electrode relative to the table, on which the turning tool is placed, in accordance with a machining program; and
 a measurement unit configured to measure a height from a reference face at a plurality of measurement points on a route of the machining program;
 wherein the controller is configured to
 calculate, for each measurement point among the plurality of measurement points, a height error of a surface of the tip with respect to a reference rake face having no tip-attaching error, on the basis of the height measured by the measurement unit;

calculate a correction amount for said each measurement point on the basis of (i) the height error calculated for said each measurement point and (ii) a taper angle of the wire electrode in performance of machining instructed by the machining program, wherein a position, on a horizontal plane, of the edge part of the turning tool accords with a position, on the horizontal plane, of an edge part of the reference rake face; and control movement of the wire electrode relative to the turning tool on the basis of the calculated correction amount.

2. The wire electric discharge machine according to claim 1, wherein when an object to be machined of the turning tool is a rotating body, the controller is configured to calculate the correction amount for said each measurement point on the basis of (i) the height error, (ii) the taper angle of the wire electrode in performance of machining instructed by the machining program, and (iii) a distance from a rotation center axis of the object to be machined to the edge part of the turning tool, wherein the distance from the rotation center axis of the object to be machined to the edge part of the turning tool accords with a distance from the rotation center axis of the object to be machined to the edge part of the reference rake face.

* * * * *